Figures 1, 2:
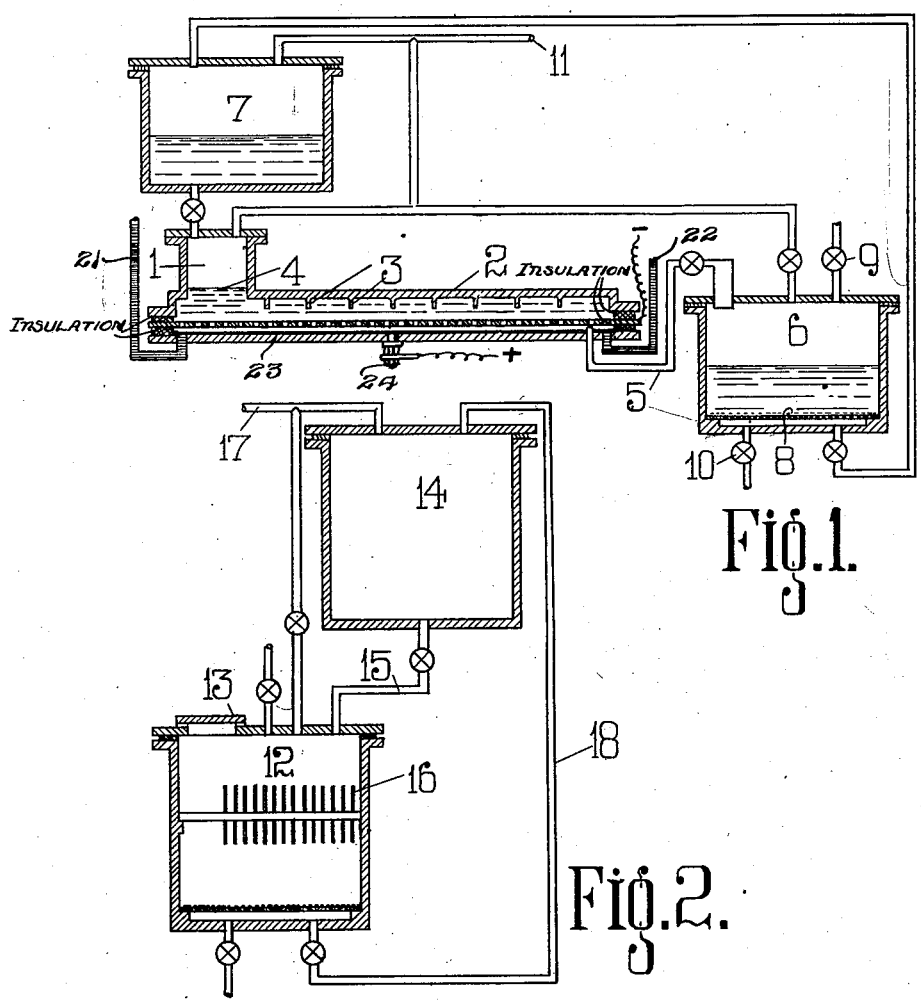

Jan. 19, 1926.

T. EWAN 1,570,467

MANUFACTURE OF ALKALI METAL AMIDES

Filed March 31, 1924

Inventor.
Thomas Ewan
by Knight Bros.
Attorneys

Patented Jan. 19, 1926.

1,570,467

UNITED STATES PATENT OFFICE.

THOMAS EWAN, OF GLASGOW, SCOTLAND.

MANUFACTURE OF ALKALI-METAL AMIDES.

Application filed March 31, 1924. Serial No. 703,104.

*To all whom it may concern:*

Be it known that I, THOMAS EWAN, a subject of the King of Great Britain, residing in Glasgow, in the county of Lanark, Scotland, have invented certain new and useful Improvements in or Relating to the Manufacture of Alkali-Metal Amides, of which the following is a specification.

This invention relates to the manufacture of alkali metal amides and will be described with reference to the manufacture of sodamide by way of example though it is also applicable to the manufacture of other amides.

It is known that solutions of sodium in anhydrous liquid ammonia slowly form sodamide with liberation of hydrogen but the reaction is exceedingly slow. Platinum accelerates the reaction catalytically.

It is the object of my invention to provide means for obtaining sodamide and other amides by a novel process. Another object is to provide a method of obtaining amides rapidly and directly at a low temperature. Another object is to produce amides from the amalgams of the corresponding metal. Further objects are to provide new methods of accelerating the reaction between alkali metals and liquid anhydrous ammonia.

The scope of the invention will be defined in the claims. The process may be carried out in various ways, of which the following are examples.

Figures 1 and 2 of the drawings illustrate suitable apparatus diagrammatically.

Example 1.

In Fig. 1 an electrolytic cell 1 is used, similar to that described in my co-pending application Serial No. 703,102 and worked in the same way with the exceptions described below. The electrolyte is a solution of 50 parts by weight of sodium cyanide in 100 parts by weight of liquid anhydrous ammonia. The amalgam contains 0.05% of sodium. The collecting and separating vessels are omitted. The cathode 19, provided with the lead 20 is constructed of an active catalyst, e. g., high-carbon steel and the ebonite lining is omitted, thus exposing the sodium solution to the catalytic action of the metal of the containing vessel 2 (e. g., steel). Additional catalytic surfaces 3 may be arranged near the surface of the electrolyte 4 so that they are in contact both with sodium solution and with electrolyte. The amalgam flows in at the pipe 21 and out at the pipe 22 forming a layer 23 which acts as anode and contacts with the lead 24. A pipe 5 is provided through which the electrolyte overflows into filter 6 without affecting the level of the electrolyte in the cell 1. The sodium produced is rapidly converted into sodium amide which is almost insoluble in the sodium cyanide solution and therefore crystallizes out as a white mud. The suspended mud is continuously swept out of the cell by feeding in fresh sodium cyanide solution from the reservoir 7. When filter 6 is filled the flow is diverted to a duplicate filter (not shown). The liquid is expelled (by raising the pressure in 6 in any convenient way) through filter plate 8 (which may be of fine wire gauze) into receiver 7. The cake of sodamide is then washed free from adhering salt solution by admitting liquid ammonia through valve 9. The washings are transferred to vessel 7. If the quantity of ammonia used in washing exceeds that consumed in the formation of the amide and carried away with the hydrogen at 11 the excess must be removed by evaporation. The washed amide is finally heated a little above its melting point (about 150° C.) and run off through valve 10 into moulds.

Example 2.

A sodium solution is made by electrolysis as described in my co-pending applications Serial Nos. 703102 and 703103, or metallic sodium made by any known method is dissolved in liquid anhydrous ammonia. Sodium cyanide is added to the solution which is placed in a steel vessel at 17° C. to 30° C. under pressure. Additional catalytic surfaces may be used. A suitable apparatus is indicated in Fig. 2 of the drawings.

Solid sodium is placed in vessel 12 through door 13, a solution of a sodium cyanide in liquid anhydrous ammonia is placed in vessel 14 (suitable quantities are 1 part sodium; 3 parts sodium cyanide and 10 parts ammonia but these may vary within wide limits; it is desirable that after mixing two liquid layers should be formed). The cyanide solution is run by pipe 15 into vessel 12. The sodium dissolves to a solution which floats on the cyanide solution, both being in contact with the steel walls of vessel 12 and with the catalytic surfaces 16. The hydrogen evolved escapes together with ammonia by pipe 17 to apparatus adapted to separate and recover them. When conversion is complete the amide is filtered off (the solution being returned to vessel 14 by pipe 18) washed, fused and run off as in example 1.

If a solution of sodium in ammonia is used instead of solid sodium, the excess ammonia introduced must be evaporated off (by heating vessel 14 for example) before the next charge is introduced.

*Example 3.*

A solution of sodium in liquid anhydrous ammonia is run into a vessel such as vessel 12, Fig. 2, in which high carbon steel is used as catalyst without the addition of a salt. It is converted into amide more slowly than in presence of the salt; the amide may be recovered as described in examples 1 and 2 except that no washing is required.

I prefer to use solid catalyst but I find that the finely divided mercury (produced when a solution of mercuric cyanide is added to the solution of sodium in ammonia) also exerts a catalytic activity.

I declare that what I claim is:—

1. The process of manufacturing alkali metal amide which comprises passing an electric current between an anode of alkali metal amalgam and a cathode immersed in a solution of inert alkali metal salt in liquid anhydrous ammonia and catalyzing the reaction between the ammonia and the metal thus removed to yield the amide.

2. The process of manufacturing an alkali metal amide which comprises bringing a solution of the alkali metal in liquid anhydrous ammonia containing a dissolved inert salt into contact with a catalyst capable of accelerating the reaction between the alkali metal and the ammonia.

3. The process of converting an alkali metal into its amide which comprises producing a solution of the alkali metal in liquid anhydrous ammonia containing a dissolved inert salt in such amount that two liquid layers are formed and simultaneously bringing both layers into contact with a solid catalyst capable of accelerating the reaction between the alkali metal and the ammonia.

4. The process of manufacturing an alkali metal amide which comprises bringing a solution of the metal in liquid anhydrous ammonia into contact with high carbon steel.

5. The process of manufacturing alkali metal amide which comprises passing an electric current between an anode of alkali metal amalgam and a cathode immersed in a solution of alkali metal cyanide in liquid anhydrous ammonia and catalyzing the reaction between the ammonia and the metal thus removed to yield the amide.

6. The process of manufacturing an alkali metal amide which comprises bringing a solution of the alkali metal in liquid anhydrous ammonia containing a dissolved inert salt into contact with a solid catalyst capable of accelerating the reaction between the alkali metal and the ammonia.

7. The process of manufacturing an alkali metal amide which comprises bringing a solution of the alkali metal in liquid anhydrous ammonia containing a dissolved alkali metal cyanide into contact with a solid catalyst capable of accelerating the reaction between the alkali metal and the ammonia.

8. The process of manufacturing sodamide which comprises passing an electric current between an anode of sodium amalgam and a cathode immersed in a solution of an inert sodium salt in liquid anhydrous ammonia and catalyzing the reaction between the ammonia and the sodium so removed to yield the amide.

9. The process of manufacturing sodamide which comprises bringing a solution of sodium in liquid anhydrous ammonia containing a dissolved inert salt into contact with a solid catalyst capable of accelerating the reaction between the sodium and the ammonia.

10. The process of manufacturing sodamide which comprises bringing a solution of metallic sodium in liquid anhydrous ammonia into contact with high-carbon steel.

11. The process of making alkali metal amide which comprises passing an electric current between an anode of alkali metal amalgam and a cathode immersed in a solution of an inert alkali metal salt in liquid anhydrous ammonia of such strength that two liquid layers are formed, and catalyzing the reaction between the alkali metal removed from the amalgam and the ammonia to yield the amide.

12. The process of making alkali metal amide which comprises passing an electric current between an anode of alkali metal amalgam and a cathode immersed in a solution of an inert alkali metal salt in liquid anhydrous ammonia of such strength that two liquid layers are formed and maintaining a solid catalyst simultaneously into contact with both layers so that the alkali metal and ammonia react to form amide.

13. The process of making sodamide which comprises passing an electric current between a sodium amalgam anode and a cathode immersed in a solution of sodium cyanide in liquid anhydrous ammonia of such strength that two liquid layers are formed, and causing the reaction between the ammonia and the sodium removed from the anode to be catalyzed to yield sodamide by contact with a surface of high-carbon steel.

14. The process of making sodamide which comprises electrolyzing an aqueous solution of a sodium salt with a mercury cathode to yield sodium amalgam, removing sodium from said amalgam by passing an electric current from said amalgam as anode to a cathode through a solution of an inert electrolyte in liquid anhydrous ammonia, and catalyzing the reaction between the sodium so removed and the ammonia to yield solid sodamide.

15. The process of making alkali metal amide which comprises removing alkali metal from an amalgam thereof and obtaining the amide from said alkali metal by catalytic acceleration of the reaction between said metal and liquid anhydrous ammonia without isolation of alkali metal.

16. Apparatus for the manufacture of alkali metal amides comprising a cell adapted to contain liquid anhydrous ammonia, means to supply alkali metal amalgam thereto as anode, a cathode, electrical connections for said anode and cathode, a filter, means to pass a suspension of amide from the cell to the filter, and means to prevent loss of ammonia from the apparatus.

In witness whereof, I have hereunto signed my name this 13th day of March 1924.

THOMAS EWAN.